(12) United States Patent
Jorgensen et al.

(10) Patent No.: US 8,905,076 B2
(45) Date of Patent: Dec. 9, 2014

(54) COOLANT-RETURN MANIFOLD SHUT-OFF VALVE

(75) Inventors: Iner M. Jorgensen, Renton, WA (US); Stanley M. Desaki, Mercer Island, WA (US)

(73) Assignee: PACCAR Inc, Bellevue, WA (US)

( * ) Notice: Subject to any disclaimer, the term of this patent is extended or adjusted under 35 U.S.C. 154(b) by 602 days.

(21) Appl. No.: 12/777,145

(22) Filed: May 10, 2010

(65) Prior Publication Data

US 2011/0272049 A1 Nov. 10, 2011

(51) Int. Cl.
*F16K 11/085* (2006.01)
*B60H 1/06* (2006.01)
*F01P 7/14* (2006.01)

(52) U.S. Cl.
CPC ................................ F16K 11/0856 (2013.01)
USPC .............. 137/625.16; 123/41.08; 237/12.3 B; 137/625.47

(58) Field of Classification Search
CPC ............ B60H 1/00885; F16K 11/0856; F16K 11/0853
USPC ............. 137/625.47, 625.16, 625.41, 625.42, 137/625.32; 251/207; 237/12.3 B, 12.3 R, 237/12.4, 5, 8 A; 123/41.02, 41.08–41.1, 123/41.29
See application file for complete search history.

(56) References Cited

U.S. PATENT DOCUMENTS

| | | | |
|---|---|---|---|
| 25,126 A * | 8/1859 | Charlson | 366/226 |
| 35,866 A * | 7/1862 | Simmons | 362/315 |
| 1,988,671 A | 1/1935 | Stout | |
| 2,102,503 A * | 12/1937 | Auger | 137/556.6 |
| 2,641,280 A * | 6/1953 | Fleischhauer | 137/625 |
| 3,171,474 A | 3/1965 | Roane | |
| 3,195,726 A * | 7/1965 | Saurenman | 210/167.14 |
| 3,216,769 A | 11/1965 | Hicks | |
| 3,800,830 A * | 4/1974 | Etter | 137/625.41 |
| 3,874,413 A * | 4/1975 | Valdez | 137/625.47 |
| 3,889,879 A | 6/1975 | Wellman | |
| 4,212,229 A * | 7/1980 | Johnson | 91/446 |
| 4,290,452 A * | 9/1981 | Takahashi et al. | 137/625.23 |
| 4,355,659 A * | 10/1982 | Kelchner | 137/625.19 |
| 4,584,781 A * | 4/1986 | Parkinson et al. | 34/92 |
| 4,883,226 A | 11/1989 | Tomita | |
| 5,343,893 A * | 9/1994 | Hogan et al. | 137/624.13 |
| 5,517,800 A * | 5/1996 | Brenner | 53/473 |
| 6,182,697 B1 * | 2/2001 | Parker et al. | 137/625.16 |
| 6,415,866 B1 | 7/2002 | Baugh | |
| 6,427,713 B1 * | 8/2002 | Dempsey et al. | 137/98 |
| 6,616,059 B2 | 9/2003 | Sabhapathy | |
| 6,647,934 B2 * | 11/2003 | Marsh et al. | 123/41.33 |
| 6,662,384 B1 * | 12/2003 | Gardenier et al. | 4/541.1 |
| 6,681,805 B2 * | 1/2004 | McLane et al. | 137/625.47 |
| 2003/0127528 A1 | 7/2003 | Sabhapathy | |
| 2007/0039653 A1 | 2/2007 | Maggard | |
| 2007/0044951 A1 * | 3/2007 | Horn et al. | 165/203 |
| 2008/0017260 A1 * | 1/2008 | Oh et al. | 137/625.3 |

* cited by examiner

*Primary Examiner* — John Rivell
*Assistant Examiner* — Frederick D Soski
(74) *Attorney, Agent, or Firm* — Christensen O'Connor Johnson Kindness PLLC

(57) ABSTRACT

A vehicular cooling system coolant-return manifold is provided that includes a plurality of ports reconfigurable by the user to open, such that coolant will flow into the manifold, or close, such that coolant will not flow into the manifold. The ports are opened and closed by rotating a valve spool in relation to the manifold body. The ports of the manifold are brought into alignment with holes in the valve spool to open a port such that coolant flows into the manifold. A plurality of positions of the valve spool in relation to the manifold body allow a user to select a position wherein the desired combination of ports are on and off.

16 Claims, 5 Drawing Sheets

COOLANT-RETURN MANIFOLD SHUT-OFF VALVE

BACKGROUND

The cooling system is essential for proper operation of vehicles of many types. Particularly, large trucks (e.g., medium- or heavy-duty trucks) rely heavily on the cooling system for optimum operation and the protection of the vehicle engine from overheating.

One feature of cooling systems of large trucks is the use of multiple circuits distributing coolant throughout the engine and returning to a central location. Several different cooling zones exist in any modern engine, and large trucks can include several circuits of coolant that service different areas of the engine. The multitude of coolant circuits typically branch from the main coolant system at different points, with each circuit typically having an individual shut-off valve. The shut-off valves are typically spaced throughout the engine area such that a centralized location does not exist where all shut-off valves are located.

Additionally, multiple shut-off valves and the related fittings increase not only the complexity of an engine coolant system, but also the cost.

What is desired, therefore, is an improved system for centrally locating the shut-off valves for the multitude of coolant circuits in a vehicular engine.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A coolant-return manifold is provided that consolidates the functions of multiple disparate shut-off valves in the coolant circuits of a vehicular engine. The manifold includes a plurality of inlet ports and an outlet port. The inlet ports feed from return coolant circuits. The manifold includes a rotatable interior valve spool that allows a user to adjust which inlet ports are allowed to flow into the manifold and which inlet ports are blocked. Thus, the manifold provides a centralized, reconfigurable junction for return coolant circuits in a vehicular engine.

In one aspect, a coolant return manifold includes a manifold body having a plurality of return-circuit ports disposed through the manifold body extending between an exterior of the manifold body and an interior of the manifold body. Within the manifold body is a tubular internal valve spool that includes a plurality of input alignment apertures extending between an outer surface of the valve spool and an interior channel of the valve spool. The valve spool is rotatable within the manifold body to a plurality of positions wherein at least one of the plurality of positions, at least one of the plurality of input alignment apertures is in radial alignment with at least one of the return-circuit ports of the manifold body.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

A vehicular cooling system coolant-return manifold is provided. The manifold includes a plurality of ports reconfigurable by the user to open, such that coolant will flow into the manifold, or close, such that coolant will not flow into the manifold. Any combination of the plurality of ports may be opened (also referred to herein as turned "on") or closed (also referred to herein as shut "off").

Figure 1:
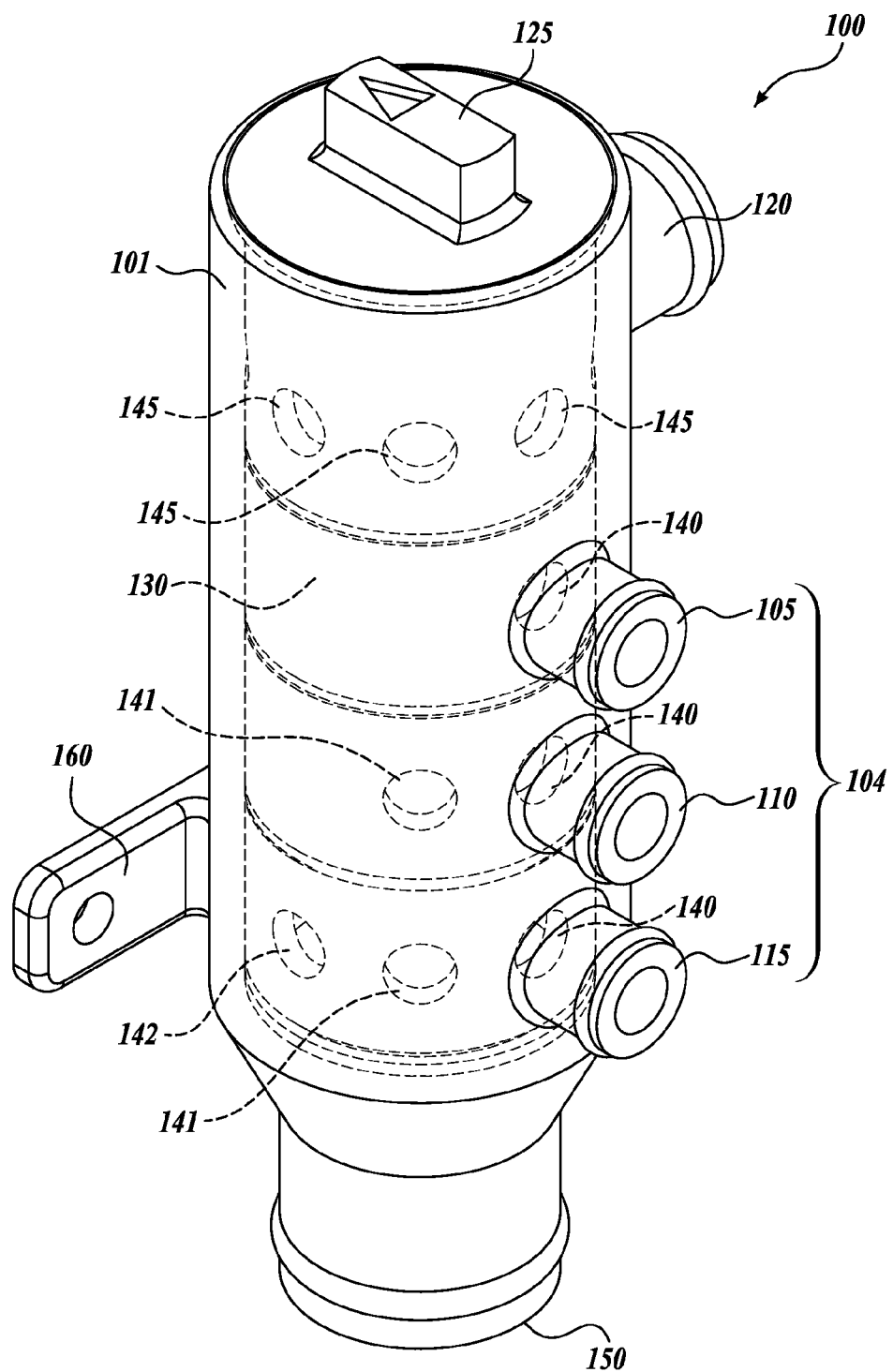
FIG. 1 is a perspective view of a coolant-return manifold in accordance with the embodiments provided herein.
Figure 2:
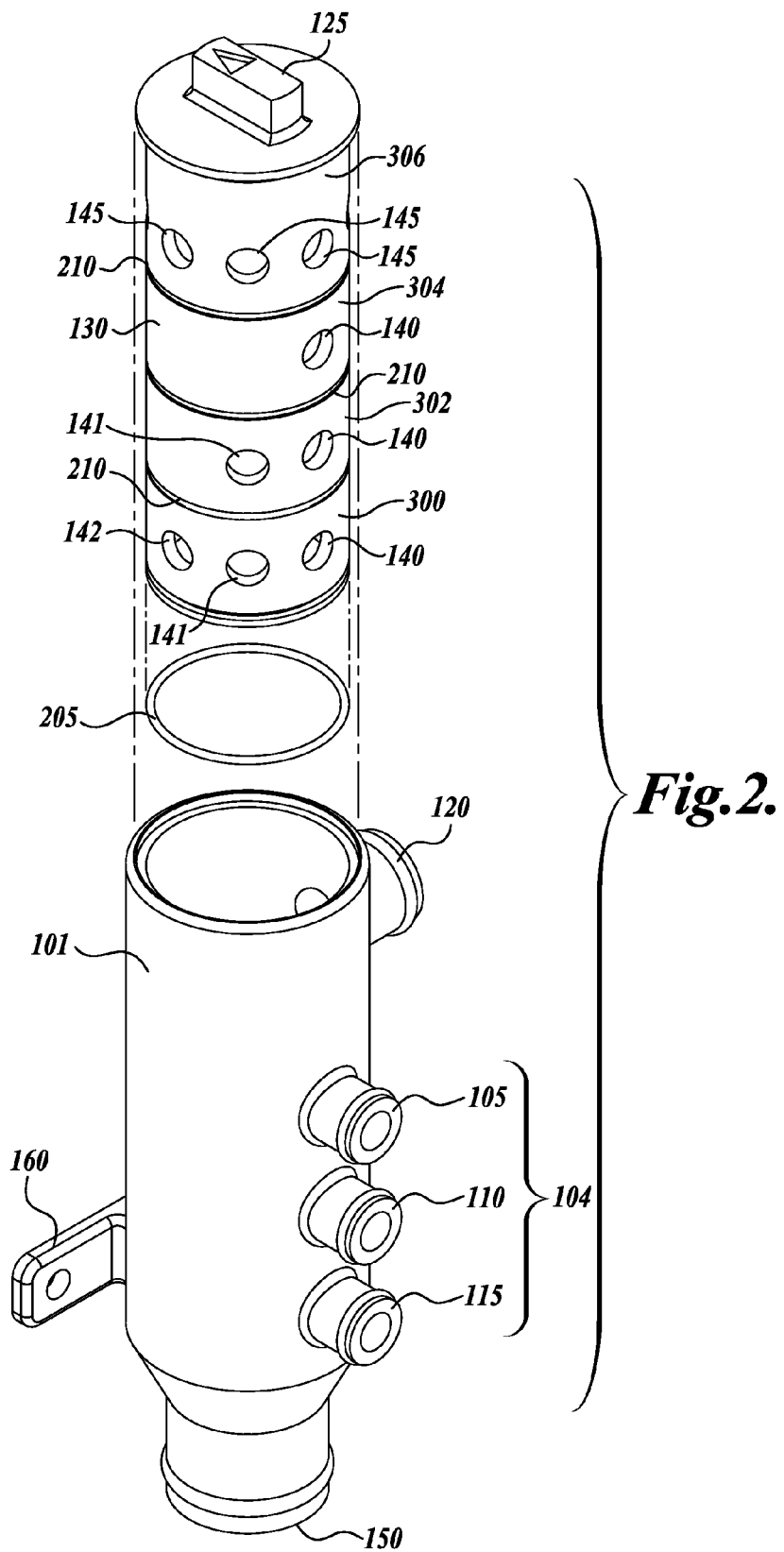
FIG. 2 is an exploded view of the manifold of FIG. 1.

Referring to FIGS. 1 and 2, a coolant-return manifold 100 is illustrated. The manifold 100 includes a manifold body 101 having a plurality of return-circuit ports 104 (individually labeled as 105, 110, and 115) and an outlet port 120. Return circuit ports 104 receive coolant from vehicular cooling systems and outlet port 120 serves to deliver coolant to vehicular coolant systems. Manifold body 101 adjacent its lower end in FIGS. 1 and 2 also includes an inlet port 150 for receiving coolant.

In the illustrated embodiments, the manifold body 101 is a cylinder with return circuit ports 104 and outlet port 120 extending radially from the interior to the exterior of the manifold body. The manifold body 101 is not limited to a cylindrical shape as illustrated in FIGS. 1 and 2, as any shape will suffice so long as the functions of the manifold 100 described herein are enabled. Return-circuit ports 105, 110, and 115 are located along the length of manifold 101 and positioned relative to each other in a line parallel to the central axis of manifold 101. In the illustrated embodiment, return-circuit ports 105, 110, and 115 are spaced equidistant from each other. The spacing between return-circuit ports 104 can also be different. In the illustrated embodiment, outlet port 120 is located above return circuit ports 104 displaced 45 degrees around the circumference of manifold body 101 from the line defined by return circuit ports 105, 110, and 115. It is possible to locate outlet port 120 more or less than 45 degrees from the line defined by return circuit ports 104.

The return-circuit ports 104 and outlet port 120 are each capable of being attached (e.g., by a hose; not illustrated) to a portion ("circuit") of a vehicular cooling system (e.g., the coolant heated fuel tank or transmission cooler; not illustrated). In the illustrated embodiments, the ports 104 and 120 are tubular radial extensions from the manifold body 101, and adapted for attachment to a hose (e.g., with a hose clamp). The ports 104 and 120 need not extend from the manifold body 101 (e.g., they can alternatively be recessed).

Nested within the manifold body 101 is a tubular internal valve spool 130 (illustrated in phantom in FIG. 1). The valve spool 130 is shaped such that it fits into an interior space of the manifold body 101. In the illustrated embodiments, the valve spool 130 is tubular so as to fit into a cylindrical space within the cylindrical manifold body 101. The valve spool 130 is cylindrical/tubular in shape in one embodiment, but other shapes are contemplated (e.g., conical), so long as the below-described functions can be performed. Specifically, the valve spool 130 rotates within the manifold body 101 to a plurality of positions and so the valve spool 130 and manifold body 101 are shaped, sized, and configured to allow for such motion.

The valve spool 130 is retained within the manifold body 101 by a retaining means (e.g., a snap ring; not illustrated), as are known to those of skill in the art.

Valve spool 130 includes a top end and a bottom end. The top end of valve spool 130 is closed and includes a selector switch 125. The bottom end which is opposite the top end is open and includes a circumferential O-ring notch 210. O-ring notch 210 is sized to receive an O-ring 205. O-ring notch 210 and O-ring 205 serve to position and secure the O-ring between valve spool 130 and manifold body 101 when valve spool 130 is seated within manifold body 101. Positioned above O-ring notch 210 located at the bottom of valve spool 130 is a second O-ring notch 210. Located above the second O-ring notch 210 is a third O-ring notch 210, and located above the third O-ring notch 210 is a fourth O-ring notch 210. Located above the fourth O-ring notch at the top of valve spool 130 is selector switch 125. Located between first O-ring notch 210 and second O-ring notch 210 is first section 300 of valve spool 130. Located above the first section 300 is a second section 302 positioned between second O-ring notch 210 and third O-ring notch 210. Located between third O-ring notch 210 and fourth O-ring notch 210 is a third section 304 of valve spool 130. Finally, located above the third O-ring notch 210 and selector switch 125 is a fourth section 306 of valve spool 130. Each of the first section 300, second section 302, third section 304, and fourth section 306 are defined by a plurality of apertures as described below in more detail.

The valve spool 130 has a plurality of input alignment apertures 140, 141, 142 and a plurality of outlet alignment apertures 145 connecting an exterior of the valve spool 130 to a hollow interior channel 405. The shape of the apertures 140, 141, 142, and 145 is circular in the illustrated embodiments, although other shapes may be used, so long as coolant is allowed to pass through the apertures 140, 141, 142, and 145. The hollow interior channel 405 provides a space within the manifold 100 wherein coolant is collected (e.g., from inlet ports 104 via inlet alignment apertures 140, 141, and 142) and distributed (e.g., through outlet port 120 via outlet alignment apertures 145).

Referring to FIG. 2, first section 300 includes three apertures 140, 141, and 142 spaced apart from each other at equally spaced locations around the circumference of valve spool 130. Second section 302 of valve spool 130 includes two input alignment apertures 140 and 141 that are spaced apart from each other around the circumference of valve spool 130. Third section 304 includes one aperture 140. Finally, fourth section 306 includes at least 3 to 5 outlet alignment apertures 145 spaced apart from each other around the circumference of valve spool 130. As can be seen in FIG. 2, alignment apertures 140 present in first section 300, second section 302, and third section 304 are aligned with each other along the length of valve spool 130. In addition, this series of alignment apertures 140 is also aligned along the length of valve spool 130 with an outlet aperture 145. The input alignment apertures 141 of first section 300 and second section 302 are also aligned along the length of valve spool 130 with an outlet alignment aperture 145 in fourth section 306. Input alignment aperture 142 of first section 300 is aligned with an output alignment aperture 145 in fourth section 306 along the length of valve spool 130. It should be understood that the number of input alignment apertures in first section 300, second section 302, and third section 304 can differ from the numbers described above. For example, first section 300 can include one aperture, second section 302 could include three apertures and third section 304 could include two apertures.

Referring to FIG. 2, an exploded view of the coolant-return manifold 100 is illustrated. The tubular internal valve spool 130 has a plurality of input alignment apertures 140, 141, 142, as well as a plurality of outlet alignment apertures 145. When arranged in longitudinal columns, the input alignment apertures 140, 141, 142 provide a number of positions, each of which allows for coolant to either flow into the hollow interior channel 405 or to be blocked from entering the hollow interior channel 405 depending on the presence, or lack thereof, of an aperture 140, 141, 142 at particular locations corresponding to return-circuit ports 104. Similarly, alignment of an outlet alignment aperture 145 with outlet port 120 provides a pathway for coolant to exit the interior channel of valve spool 130. When an outlet alignment aperture 145 is not aligned with outlet port, coolant within valve spool cannot exit the manifold via outlet port 120.

An optional feature of the coolant-return manifold 100 is illustrated in FIG. 2, wherein an O-ring 205 can be used to seal each lateral division of apertures 140, 141, 142, and 145 so as to prevent coolant from flowing into or out of the hollow interior channel 405 when not desired. A plurality of O-ring notches 210 (or 410 in FIGS. 4-6) provide locations where O-rings 205 can be immobilized.

Each portion of a vehicular cooling system may not be required to operate at all times (e.g., the coolant-heated fuel tank is not needed during the winter) and the continued use of such a portion of the cooling system results in wasted resources within the cooling system, and vehicle in general. The embodiments provided herein allow for a user to select, using manual (e.g., with a selector switch 125) or automatic means, the combination of return-circuit ports 104 that are actively used in the cooling system (i.e., which circuits are turned on).

In operation of the manifold 100, return-circuit ports 104 are selectively opened and closed by rotating the internal valve spool 130 in relation to the manifold body 101. Specifically, the alignment apertures 140, 141, and 142 can be radially aligned with the return-circuit ports 104, according to the user-defined rotational position of the valve spool 130 in relation to the manifold body 101. In a similar manner, an outlet alignment aperture 145 can be radially aligned with the outlet port 120.

Figure 4:
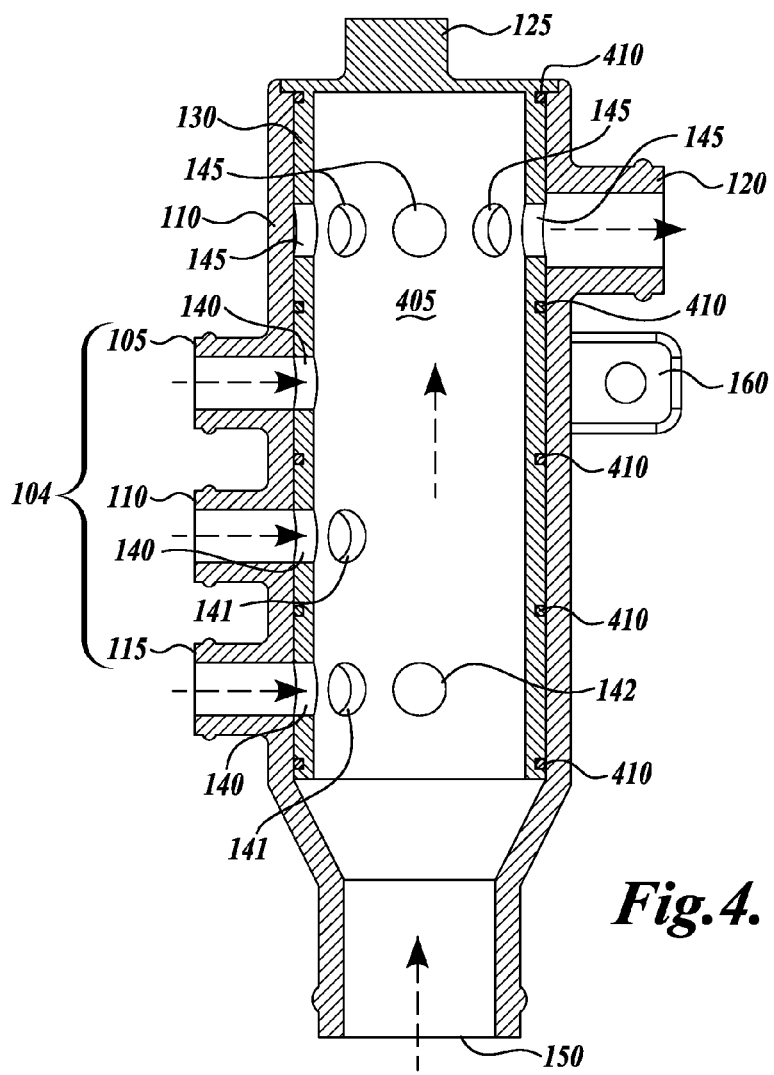
FIG. 4 is a cross-sectional view of the manifold of FIG. 1.
Figure 5:
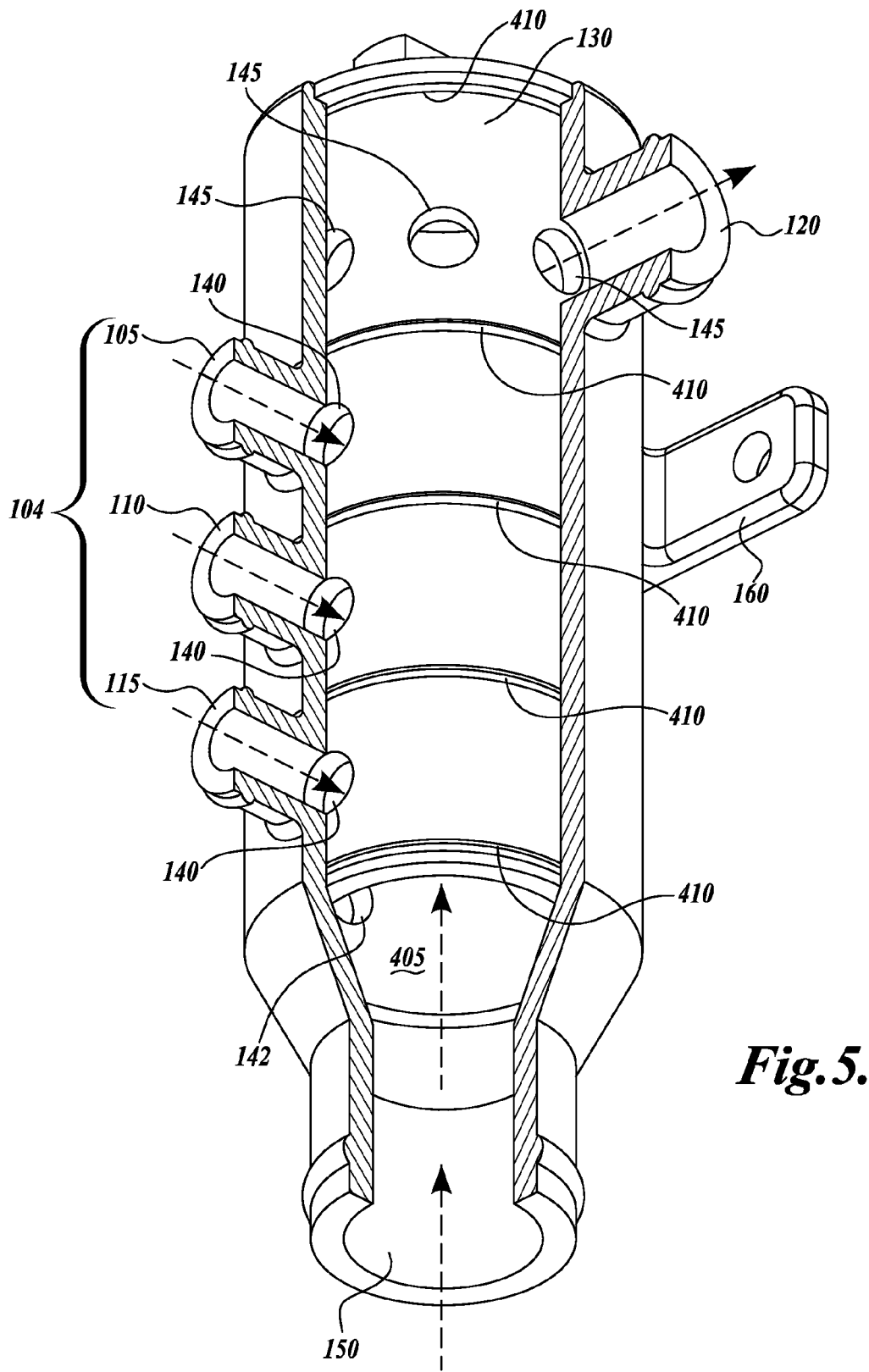
FIG. 5 is a partial cutaway view of the manifold of FIG. 1, wherein a valve spool 130 is in a first position.

As an example of the manifold 100 configured for use, referring to FIGS. 1, 4, and 5, the valve spool 130 is positioned such that inlet alignment apertures 140 are radially aligned with all three of the return-circuit ports 105, 110, and 115; and an outlet alignment aperture 145 is aligned with outlet port 120. Thus, coolant is allowed to flow into the manifold 100 through return-circuit ports 105, 110, and 115, and into the interior channel 405 through input alignment apertures 140. Coolant then is collected in the interior channel 405 and flows to the outlet port 120 through the outlet alignment aperture 145.

In the exemplary embodiments illustrated in FIGS. 1-6, the selector switch 125 rotates the valve spool 130 between the plurality of positions so as to align, or not align, the apertures 140, 141, 142, and 145 with the return-circuit ports 104 and outlet port 120.

Figure 3:
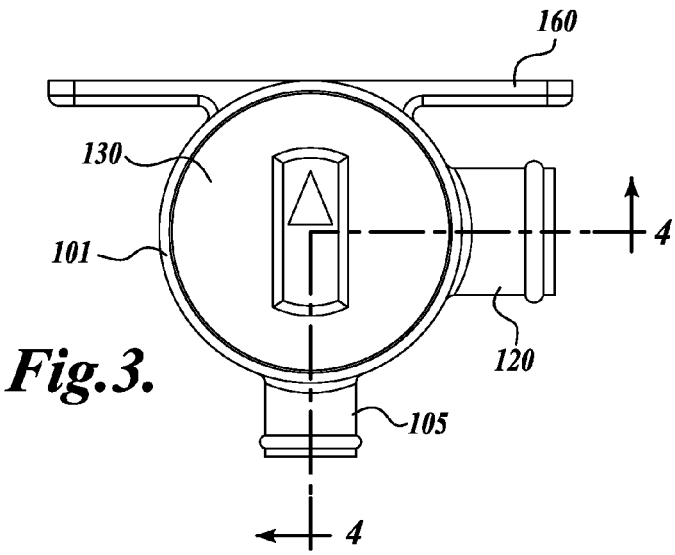
FIG. 3 is a plan view of the manifold of FIG. 1.

Referring to FIG. 3, a plan view of the coolant-return manifold 100 is illustrated with cross-sectional reference lines indicating the perspective of FIG. 4.

Referring to FIG. 4, a cross-sectional view of the coolant-return manifold 100 is illustrated, wherein the valve spool 130 is positioned such that each of the return-circuit ports 104 is "open" such that coolant flowing through return-circuit ports 105, 110, and 115 will flow through the aligned input alignment apertures 140 and into the hollow interior channel 405.

Figure 6:
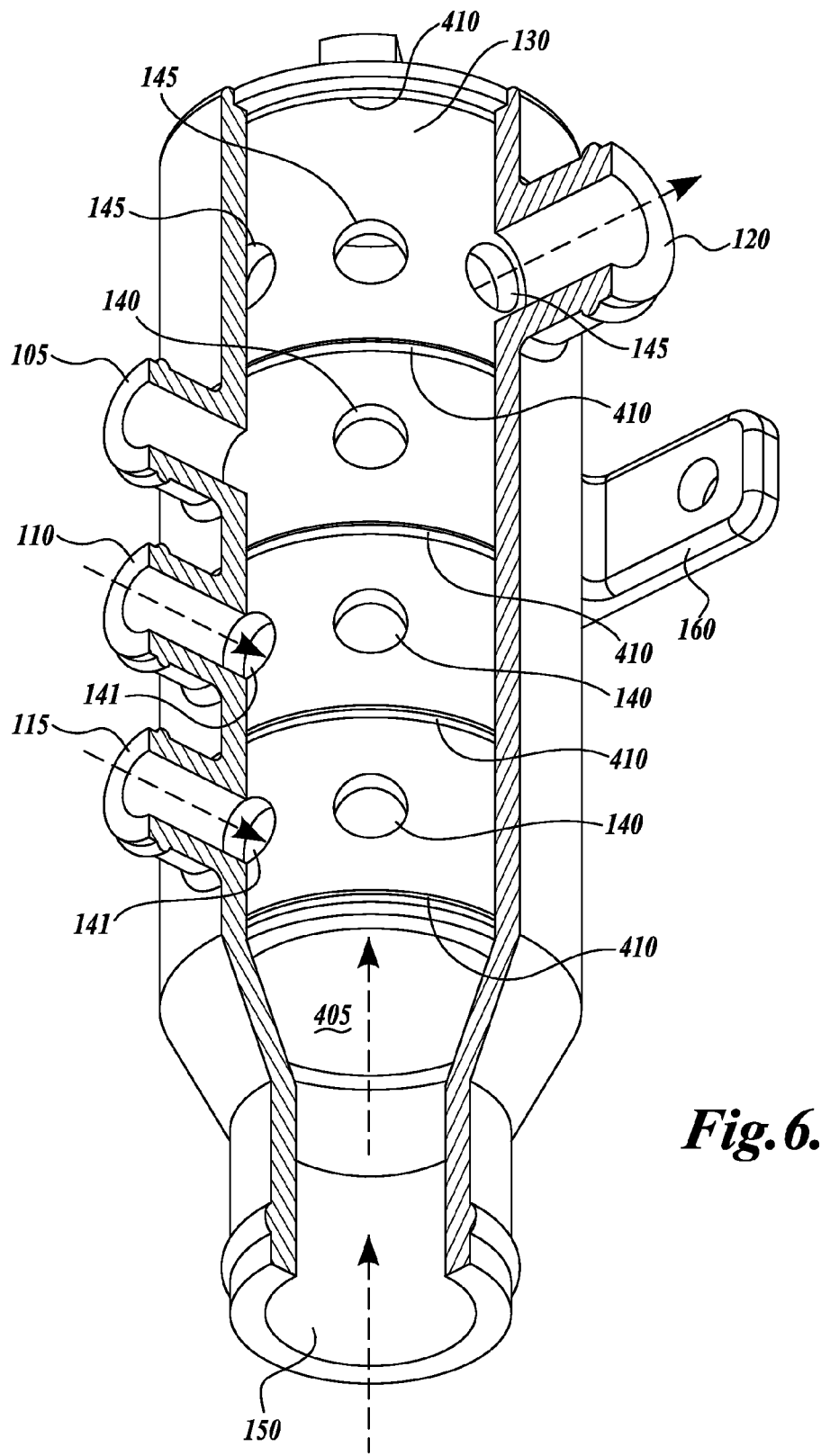
FIG. 6 is a partial cutaway view of the manifold of FIG. 5, with the valve spool 130 rotated to a second position.

The flow of coolant is indicated with arrows in FIGS. 4, 5, and 6.

In the embodiment illustrated in FIG. 4, the main inlet port 150 introduces a larger stream of coolant from the cooling system (not illustrated), which then flows upward through the hollow interior channel 405 where it is joined by coolant flowing in from the return-circuit ports 104. The coolant then exits the hollow interior channel 405 by flowing through a single outlet alignment aperture 145 that is in radial alignment with the outlet port 120. One or more inlet ports (e.g., inlet port 150 in the illustrated embodiment) are designated to be left "open". These circuits are required during vehicular operation and cannot be shut off.

While the illustrated embodiment includes an inlet port 150 that is larger in diameter than other ports 104, the embodiments are not limited to such sizing. Each port 150 and 104 is sized according to the flow required to pass through each port in the desired application.

Referring to FIG. 5, a partial cutaway view of the coolant-return manifold 100 is illustrated. The manifold body 101 is cut away to reveal the valve spool 130 positioned such that coolant flowing towards the coolant-return manifold 100 enters the return-circuit ports 104 and flows through the input alignment apertures 140 into the hollow interior channel 405. Coolant additionally flows into the hollow interior channel 405 from the main inlet port 150, and the combined coolant flows out of the hollow interior channel 405 through the outlet alignment aperture 145 aligned with the outlet port 120.

FIG. 6 illustrates the coolant-return manifold 100 similar to that of FIG. 5; however, the valve spool 130 is rotated in relation to the manifold body 101 (e.g., the selector switch 125 has been rotated to a different position). In the valve spool 130 position of FIG. 6, return-circuit port 105 is no longer in radial alignment with an input alignment aperture 140 (or input alignment apertures 141 or 142) and, thus, coolant flowing into return-circuit port 105 is blocked and the coolant circuit related to return-circuit port 105 is effectively turned off. The coolant circuits related to return-circuit ports 110 and 115 remain on, because radial alignment with input alignment apertures 141 allows coolant to flow into the hollow interior channel 405.

While the illustrated examples herein include the outlet port 120 being in radial alignment with an outlet alignment aperture 145, it will be appreciated that a valve spool 130 can be manufactured having a position whereby no alignment exists at a particular position between the outlet alignment apertures 145 and the outlet port 120.

Additional embodiments not illustrated herein include coolant return-circuit ports that can be selectively turned on and off, as described above, but wherein the inlet port 150 and outlet port 120 (and related structures) are differently arranged. For example, instead of having a plurality of outlet alignment apertures 145, as illustrated in FIGS. 1-6, a constantly-open configuration could be used, where no valve spool 130 wall exists blocking the path of coolant to the outlet port 120.

In yet another embodiment, the outlet port 120 and main inlet port 150 are both located adjacent each other as opposed to opposite ends of the coolant-return manifold 100 as depicted in the illustrated embodiments.

The materials used to manufacture the coolant-return manifolds provided herein include polymers and metals. In one embodiment, the coolant-return manifold parts are manufactured using injection-molded nylon/glass composite. The construction of coolant manifolds is generally known to those of skill in the art. The tubular internal valve spool is typically made from plastic having molded or drilled orifices to be used as alignment apertures 140 and 145.

The return-circuit ports 104, outlet port 120, and main inlet port 150 can include connections known to those of skill in the art, such as threaded or hose-bead connections, so as to allow for proper connection of the coolant-return manifold 100 to the vehicular cooling system.

Referring to the figures, an optional attachment structure 160 is configured so as to allow for the coolant-return manifold 100 to be clamped, bolted, or otherwise attached to the structure of the engine environment wherein the coolant-return manifold 100 is to be situated. Optionally, attachment features can be integrated into the body of the manifold 100 by the use of threaded studs, u-bolt clamps, or variation thereof. Preferably, the coolant-return manifold 100 is situated such that a user will have access to the selector switch 125 so as to allow for easy reconfiguration of the coolant-return manifold 100 to access different cooling circuits via the different positions of the valve spool 130 in relation to the manifold body 101.

The selector switch 125, as discussed above, is a manually-movable switch; however, in one embodiment, the coolant-return manifold 100 does not have a selector switch 125, but instead has an automated mechanism for rotating the valve spool 130 in relation to the manifold body 101 to switch to a new position.

The positions of the valve spool 130 can be continuous or indexed. For example, indexed positions may have knurling and the selector switch 125 would be seated in a particular position wherein alignment of the alignment apertures 140, 141, 142, and 145 for a particularly desired configuration is set (e.g., by friction of the knurling).

The number of return-circuit ports 104 and outlet ports 120 is not limited to the numbers illustrated herein. Typically, the larger the number of return-circuit ports 104, the larger the manifold body 101 will need to be. Additionally, the alignment of the return-circuit ports 104 and outlet port 120 in relation to each other is not limited to those configurations illustrated in the figures. It will be appreciated that the return-circuit ports and outlet ports need not be linear (in latitudinal and longitudinal directions), such as the illustrated return-circuit ports 104, and may be spaced latitudinally and longitudinally on the manifold body 101 so as to suit the particular needs of the user and the directions from which the coolant circuits approach the coolant-return manifold 100.

Referring to FIG. 1, in one embodiment involving a Class 8 truck, the "always on" inlet port 150 is supplied by a defrost heater circuit, inlet port 105 is supplied by a primary cab heater circuit, inlet port 110 is supplied by a sleeper-cab heater circuit, and inlet port 115 is supplied by a fuel heater circuit.

While illustrative embodiments have been illustrated and described, it will be appreciated that various changes can be made therein without departing from the spirit and scope of the invention.

The invention claimed is:

1. A coolant-return manifold comprising:
   a tubular manifold body comprising a first return-circuit port coupled to a first vehicle heater circuit and a second return-circuit port, a coolant inlet, and a coolant outlet, wherein the first return-circuit port and the second return-circuit port are spaced longitudinally along the manifold body; and
   a tubular internal valve spool disposed inside the manifold body, having a plurality of alignment ports extending between an outer surface of the valve spool and a hollow interior of the valve spool, wherein the valve spool is rotatable within the manifold body to a plurality of positions, in at least one of said plurality of positions, at least one of the plurality of alignment ports is in radial alignment with one of the return-circuit ports on the manifold body, wherein each return-circuit port is radially aligned with less than two alignment ports in each of the plurality of positions, wherein there is liquid communication between at least one alignment port, one of the return-circuit ports, and the coolant outlet at each of the plurality of positions of the valve spool, wherein, in a first position:
(a) a first alignment port is radially aligned with the first return-circuit port, such that coolant flowing into the first return-circuit port from the first vehicle heater circuit will be passed through the first alignment port and into the hollow interior of the valve spool; and
(b) a second alignment port is radially aligned with the coolant outlet, such that coolant flowing into the hollow interior of the valve spool will pass through the second alignment port and coolant outlet, and wherein, in a second position:
(a) a third alignment port is radially aligned with the first return-circuit port, such that coolant flowing into the first return-circuit port from the first vehicle heater circuit will be passed through the third alignment port and into the hollow interior of the valve spool;
(b) a fourth alignment port is radially aligned with the second return-circuit port, such that coolant flowing into the second return-circuit port will be passed through the fourth alignment port and into the hollow interior of the valve spool; and
(c) a fifth alignment port is radially aligned with the coolant outlet, such that coolant flowing into the hollow interior of the valve spool will pass through the fifth alignment port and coolant outlet, and wherein coolant flows into the valve spool through the coolant inlet in the first and second positions.

2. The coolant-return manifold of claim 1, wherein the manifold body and internal valve spool are comprised of a material independently selected from the group consisting of plastic, metal, and combinations thereof.

3. The coolant-return manifold of claim 1, wherein there is liquid communication between at least one alignment port, the coolant inlet, the second return-circuit port, and the coolant outlet in at least one but not all of the plurality of positions of the valve spool.

4. The coolant-return manifold of claim 1, wherein the first vehicle heater circuit includes at least one of a primary cab heater circuit or a fuel heater circuit.

5. The coolant-return manifold of claim 1, further comprising a third return-circuit port coupled to a second vehicle heater circuit other than the first vehicle heater circuit, wherein the third return-circuit port is spaced longitudinally on the manifold body.

6. The coolant-return manifold of claim 5, wherein there is liquid communication between at least one alignment port, the coolant inlet, the third return-circuit port, and the coolant outlet in one position of the plurality of positions of the valve spool such that coolant flows into the valve spool through the coolant inlet and into the third return-circuit port from the second vehicle heater circuit, and coolant flows out of the valve spool through the coolant outlet.

7. The coolant-return manifold of claim 5, wherein there is liquid communication between at least one alignment port, the coolant inlet, the second return-circuit port, the third return-circuit port, and the coolant outlet in at least one but not all of the plurality of positions of the valve spool.

8. The coolant-return manifold of claim 1, wherein in a third position:
(a) a sixth alignment port is radially aligned with the first return-circuit port, such that coolant flowing into the first return-circuit port from the first vehicle heater circuit will be passed through the sixth alignment port and into the valve spool;
(b) a seventh alignment port is radially aligned with the second return-circuit port, such that coolant flowing into the second return-circuit port from a third vehicle heater circuit will pass through the seventh alignment port and into the valve spool; and
(c) an eighth alignment port is radially aligned with the coolant outlet, such that coolant flowing into the hollow interior of the valve spool will pass through the eighth alignment port and coolant outlet.

9. The coolant-return manifold of claim 8, wherein in the second position, the first alignment port is not aligned with the first return-circuit port and the second alignment port is not aligned with the second return-circuit port.

10. The coolant-return manifold of claim 8, wherein in a third position:
(a) a ninth alignment port is radially aligned with the first return-circuit port, such that coolant flowing into the first return-circuit port from the first vehicle heater circuit will be passed through the ninth alignment port and into the valve spool;
(b) a tenth alignment port is radially aligned with the second return-circuit port, such that coolant flowing into the second return-circuit port from the third vehicle heater circuit will be passed through the tenth alignment port and into the valve spool; and
(c) an eleventh alignment port is radially aligned with the coolant outlet, such that coolant flowing into the hollow interior of the valve spool will pass through the eleventh alignment port and coolant outlet.

11. A coolant-return manifold comprising:
a manifold body comprising at least three return-circuit ports extending between an exterior of the manifold body and an interior of the manifold body;
a tubular internal valve spool disposed inside the manifold body and comprising a plurality of input alignment apertures, said input alignment apertures extending between an outer surface of the valve spool and an interior channel of the valve spool; and
a coolant outlet alignment aperture extending between the exterior of the valve spool and the interior of the valve spool to provide liquid communication between the interior channel of the valve spool and an outlet port extending between an exterior of the manifold body and an interior of the manifold body,
wherein the valve spool is rotatable within the manifold body to a plurality of positions, in each of said plurality of positions at least one of the plurality of input alignment apertures is in radial alignment with one of the return-circuit ports on the manifold body, wherein each return-circuit port is in radial alignment with at most one input alignment aperture at each of the plurality of positions,
wherein there is liquid communication between at least one return-circuit port and the coolant outlet port at each of the plurality of positions of the valve spool,
wherein in a first position, a first return-circuit port and the coolant outlet port are in liquid communication through a first input alignment aperture, a second return-circuit port and the coolant outlet port are in liquid communication through a second input alignment aperture, and a third return-circuit port and the coolant outlet port are in liquid communication through a third input alignment aperture, wherein coolant flows from the first return-circuit port, the second return-circuit port, and the third return-circuit port through the valve spool and out the outlet port, wherein the first return-circuit port is coupled to a first vehicle heater circuit, wherein the second return-circuit port is coupled to a second vehicle heater circuit, and wherein in the first position, coolant flows through the first vehicle heater circuit.

12. The coolant-return manifold of claim 11, wherein the outlet port is disposed adjacent an end face of the internal valve spool.

13. The coolant-return manifold of claim 11, wherein the manifold body is tubular.

14. The coolant-return manifold of claim 11, wherein the manifold body and internal valve spool are comprised of a material independently selected from the group consisting of plastic, metal, and combinations thereof.

15. The coolant-return manifold of claim 11, wherein in a second position, the first return-circuit port and the coolant outlet port are in liquid communication through a fourth input alignment aperture, the second return-circuit port and the coolant outlet port are in liquid communication through a fifth input alignment aperture, and the third return-circuit port is not in liquid communication with the coolant outlet port through the valve spool, wherein in the second position, coolant flows through the first and second vehicle heater circuits and coolant does not flow through the third vehicle heater circuit.

16. The coolant-return manifold of claim 15, wherein in a third position, the first return-circuit port and the coolant outlet port are in liquid communication through a sixth input alignment aperture and the second and third return-circuit ports are not in liquid communication with the coolant outlet port through the valve spool, wherein in the third position, coolant flows through the first vehicle heater circuit and coolant does not flow through the second and third vehicle heater circuits.

* * * * *